United States Patent [19]

Gajajiva et al.

[11] 4,054,305
[45] Oct. 18, 1977

[54] THREAD MAKING FITTING FOR UNTHREADED CONDUIT

[75] Inventors: Padej Gajajiva, Elmhurst; John Stokes, East Northport, both of N.Y.

[73] Assignee: I-T-E Imperial Corporation Efcor Division, East Farmingdale, N.Y.

[21] Appl. No.: 677,380

[22] Filed: Apr. 15, 1976

[51] Int. Cl.² .......................................... F16L 35/00
[52] U.S. Cl. ................................ 285/39; 285/40; 285/93; 285/355
[58] Field of Search ............... 285/40, 355, 93, 332.2, 285/390, 39; 85/32 V; 403/289, 290, 313, 343; 138/96 T; 408/221; 279/94, 100, 101

[56] References Cited
U.S. PATENT DOCUMENTS

| 1,722,783 | 7/1929 | Basseches | 85/32 V |
| 1,781,199 | 11/1930 | Sixma | 285/40 |
| 2,111,627 | 3/1938 | Hinderliter | 285/332.2 X |
| 2,152,962 | 4/1939 | Ice | 285/40 |
| 2,580,818 | 1/1952 | Mundy et al. | 285/40 |
| 2,932,305 | 4/1960 | Kirche | 285/40 X |
| 3,463,517 | 8/1969 | Courtot et al. | 285/93 |

Primary Examiner—Dave W. Arola
Attorney, Agent, or Firm—Friedman, Goodman & Teitelbaum

[57] ABSTRACT

An elongated fitting, which forms a thread as it is screwed onto the end of a conduit, has an internally threaded tubular portion at one end which receives the conduit. A stem portion on the opposite end permits coupling of the fitting to external parts. An intermediate portion is provided for rotating the fitting relative to the conduit. A longitudinal slot axially extends along the wall of the tubular portion to permit visual inspection of the amount of conduit inserted in the fitting and for lowering the tightening torque required for forming the threads on the conduit.

5 Claims, 5 Drawing Figures

THREAD MAKING FITTING FOR UNTHREADED CONDUIT

BACKGROUND OF THE INVENTION

This invention relates to fittings and more particularly to conduit fittings which form threads on the end of an unthreaded conduit while coupling thereto.

There are presently available various types of thread making fittings. These fittings roll threads as the fitting is tightened onto a conduit. Typically, the fitting includes a sleeve having internal threads. The conduit is slid into the sleeve and the fitting is turned onto the end of the conduit to thereby roll threads on the conduit while making connection thereto. In rolling the threads, it is necessary to apply a great amount of torque to the fitting in order to turn it onto the conduit. It is quite possible to torque the fitting onto the conduit and not know when to stop. Generally, the ability to resist pull-out forces is dependent upon the amount of turns obtained by tightening applied to the fitting. However, it is not possible to determine when the required number of turns have been completed. Furthermore, when applying the fitting in a hurry, the conduit will be inserted into the fitting and only a minimal amount of turns will be completed which will be insufficient to provide the amount of tightening needed to resist the pull-out.

With existing prior art fittings, it is almost impossible to inspect the fitting after installation to determine if it has been properly tightened. Since there is no indication on the conduit to indicate the proper depth to which it has entered into the fitting, nor is there any indication on the fitting itself, it is quite possible that an insufficient amount of conduit has entered into the fitting and insufficient tightening has taken place. Similarly, it is possible that too much tightening has occurred and the excessive amount of tightening has caused a stripping of the threads which will loosen the retention between the conduit and the fitting and will reduce the ability to resist pull-out forces.

In many uses, it is necessary to provide a liquid tight fitting. For example, when using conduits for external electrical connections it is necessary to provide for water tightness between the fitting and the conduits. Many of the prior art conduit fittings use a metal to metal contact between the conduit end and an internal seat on the fitting. For example, U.S. Pat. No. 3,272,539 describes such a metal to metal contact. These contacts are not adequate for a liquid tight fitting under all conditions.

SUMMARY OF THE INVENTION

It is accordingly an object of the present invention to provide a conduit fitting of the aforementioned type which avoids the problems of prior art devices.

Another object of the present invention is to provide a conduit fitting which forms a thread on the end of an unthreaded rigid conduit as it couples thereto.

Still a further object of the present invention is to provide a thread making fitting which permits visual inspection to determine the depth of insertion of the conduit into the fitting.

Yet a further object of the present invention is to provide a thread making fitting which requires a lower tightening torque as compared to prior art devices, and which will retain the same pull-out resistance.

Still a further object of the present invention is to provide a thread making fitting which includes means by which it can be determined that the fitting has been properly tightened.

Briefly, the invention describes an elongated fitting for forming a thread on the end of a conduit. An internally threaded tubular portion is formed at one end of the fitting and is adapted to receive the unthreaded end of the conduit. A stem portion is formed on the opposite end of the fitting and is adapted to couple the fitting to external parts. An intermediate portion is provided for rotating the fitting relative to the conduit to thereby form the threads on the end of the conduit inserted into the tubular portion. A longitudinal slot axially extends along the wall of the tubular portion.

In the present invention, the slot extends from the outer end of the tubular portion and continues until a spaced distance from a conduit stop. There is also included a transverse seat within the intermediate portion spaced from the conduit stop. A sealing means, such as a resilient gasket, is transversely positioned within the fitting and is retained by the seat.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various FIGURES of the drawing, like reference characters designate like parts.

DESCRIPTION OF THE PREFERRED EMBODIMENT

Figure 1:
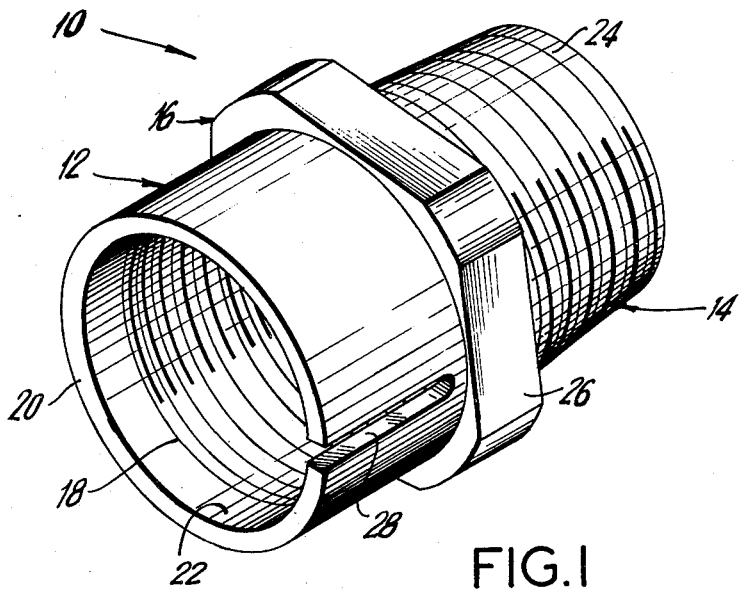
FIG. 1 is a perspective view of the conduit fitting in accordance with the present invention.
Figure 2:
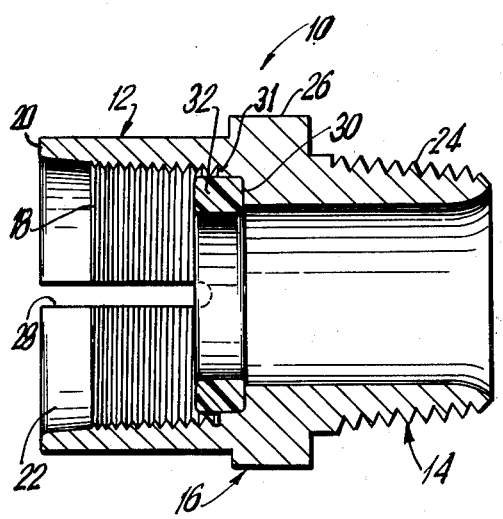
FIG. 2 is a sectional view through the center of the fitting.

Referring now to the drawings, there is shown a conduit fitting 10 formed as an elongated structure having a tubular portion 12 at one end and a tapered stem portion 14 at the other end. An intermediate section 16 is provided to aid in rotating the fitting relative to the conduit.

The tubular portion contains a case hardened fine pitched internal thread 18. The threads are shown as commencing a spaced apart distance from the outer edge 20 of the tubular member thereby leaving an unthreaded portion 22 at the front end of the tubular portion, where the internal surface of the tubular portion 12 is tapered inwardly from the outer edge.

The tapered stem portion 14 contains means for connecting the fitting to external parts, such as additional conduits or conduit boxes. By way of example, the stem is shown with an external thread 24. The intermediate portion contains a plurality of flat sections 26 which form a nut for permitting tightening of the fitting onto the conduit.

A longitudinal slot 28 extends axially along the wall of the tubular member 12. The slot extends through the wall and is shown as commencing from the outer end 20 of the tubular member 12 and extends therefrom towards the intermediate portion 16.

A transverse seat 30 is located within the intermediate portion 16 of the fitting and a sealing member, shown as the resilient gasket 32, is retained by the seat. The seat is shown being formed by a transverse wall section which separates the smaller internal diameter stem portion 14 from the larger diameter portion 12. The slot 28 is shown as extending up to a spaced distance from the seat and from the walls of the intermediate portion 16, and also from a conduit stop 31 provided in the tubular portion 12. The conduit stop is formed by a transverse wall section which is at the end of the thread 18 and spaced from the seat 30.

The fitting 10 is used for coupling to a rigid conduit 34 and avoids the need of utilizing a threaded conduit by forming its own threads 36 on the conduit 34 as it couples thereto. The conduit 34 is initially inserted into the front end of the tubular portion 12. The unthreaded end 22 is provided so that the conduit can be easily inserted into the fitting. The inside diameter of the end 22 is made slightly larger than the outside diameter of the conduit 34 so that the conduit will easily fit into the fitting. The threads are formed on the inside surface of the tubular portion, which is tapered by about 2° to insure a tight fit between the conduit and the fitting.

After the conduit is inserted into the open end of the fitting, the fitting is tightened onto the conduit by turning the fitting onto the conduit. Alternately, it is possible to turn the conduit while holding the fitting firm. The flat nut 16 is available for utilizing a wrench to torque the fitting or alternately retain the fitting while torquing the conduit. As the fitting is screwed onto the conduit, the case hardened threade deform the surface on the conduit such that after several turns, it is captured on the conduit.

As the conduit is moved into the fitting, the front end of the conduit will be visible through the slot 28 and its position in the fitting can be monitored. In this way, it is possible to visually inspect the fitting to insure that a sufficient amount of conduit has entered the fitting. This will insure that adequate torque has been applied to the fitting to obtain the required amount of turns necessary for resistance to pull-out forces. At the same time, the slot will allow the tubular portion 12 to transversely expand slightly outwardly to provide for a lower tightening torque. Nevertheless, it has been found that despite the presence of the slot, it is possible to obtain the same pull-out resistance as if the slot is not present. Thus, the same result is obtained with less tightening torque.

Figure 3:
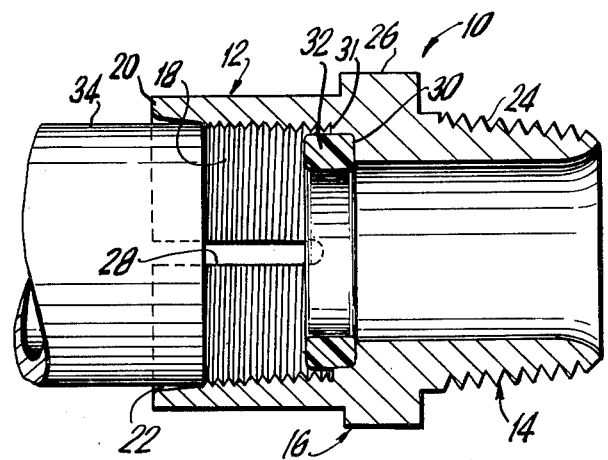
FIG. 3 is a view similar to FIG. 2 and showing the insertion of the conduit into the fitting.
Figure 4:
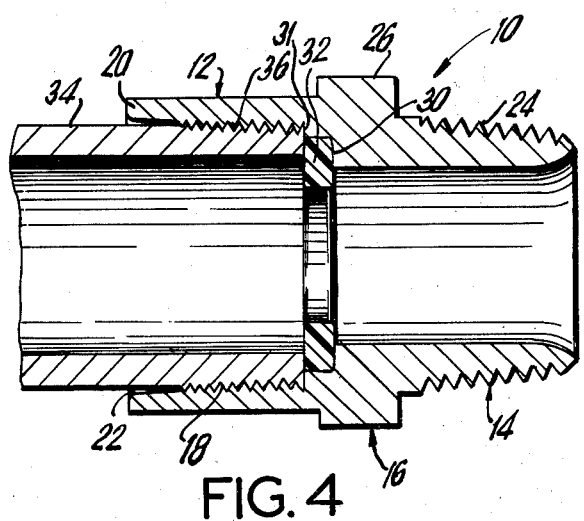
FIG. 4 is a sectional view showing the fitting coupled to the conduit.
Figure 5:
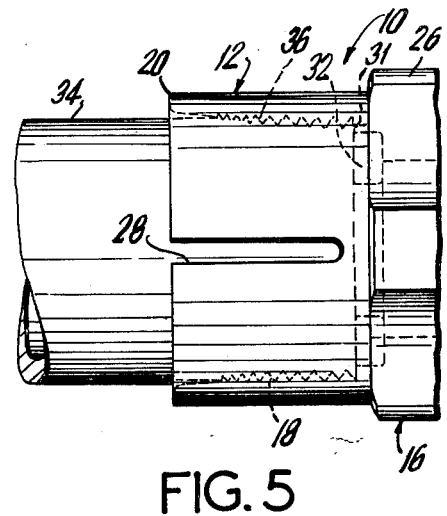
FIG. 5 is a partial side view showing the conduit inserted within the fitting.

The conduit will continue its movement into the fitting, abutting against the resilient gasket and it will then stop when it reaches the conduit stop 31. In the completely tightened position, the end of the conduit will press against the resilient gasket and slightly deform it as it pushes the gasket 32 against the seat 30. This slight deformity of the gasket can be noted by comparing the shape of the gasket in FIGS. 3 and 4. The resilient gasket will provide a water tight connection between the conduit and the fitting, and at the same time prevent stripping of the threads due to overtightening. Typically, the fitting can be formed of a hardened steel, and the gasket can be formed of plastic material. Other similar materials could be used, which are well known in the art.

Utilizing the present invention, it is possible to visually inspect the fitting to insure its proper installation. Also, lower tightening torques can be utilized to retain the same pull-out resistance as if the slot had not been there. Additionally, by utilizing the conduit stop, there is provided for the user a means by which he will know when the fitting has been properly tightened. The resilient gasket between the conduit and the seat will provide a water tight connection and will also prevent stripping of the threads due to overtightening.

Numerous alterations of the structure herein will suggest themselves to those skilled in the art. However, it is to be understood that the present disclosure relates to a preferred embodiment of the invention which is for purposes of illustration only and is not to be construed as a limitation of the invention.

What is claimed is

1. An elongated fitting for forming threads onto an end of a conduit, comprising:
    a tubular portion at one end of the fitting having an internal thread and adapted to receive the end of the conduit;
    said tubular portion being provided with slot means to allow outward transverse expansion of said tubular portion for reducing tightening torque between said tubular portion and the conduit, and for permitting visible inspection of the conduit when inserted in said tubular portion;
    a stem portion on an opposite end of the fitting adapted to couple said fitting to external parts;
    an intermediate portion providing means for rotating said fitting relative to the conduit, to thereby provide the threads on the end of the conduit which is inserted into the tubular portion;
    said slot means including a longitudinal slot axially extending in a path from an outer end of said tubular portion to a spaced distance from said intermediate portion along a wall of said tubular portion, said slot extending transversely through said wall for entire length of said path to permit said expansion;
    a transverse wall section being provided within said tubular portion at one end of said internal thread adjacent to said intermediate portion for providing a stop to the inserted conduit; and
    said slot being axially spaced from said stop.

2. A fitting as in claim 1, and further comprising sealing means transversely positioned within said fitting for abutment against the end of the conduit.

3. A fitting as in claim 2, and wherein said sealing means is a resilient gasket.

4. A fitting as in claim 2, and wherein an inner diameter of said stem portion is less than an inner diameter of said tubular portion, and further including a second transverse wall section interconnecting said two diameters, said second wall section providing a seat for said sealing means.

5. A fitting as in claim 1, and further comprising another transverse section within the fitting for providing a seat for sealing means, said sealing means being transversely positioned on said seat for abutment against the end of the conduit.

* * * * *